(12) United States Patent
Schneider et al.

(10) Patent No.: US 7,826,946 B2
(45) Date of Patent: Nov. 2, 2010

(54) METHOD AND DEVICE FOR MONITORING THE STATE OF VEHICLE CHASSIS

(75) Inventors: Richard Schneider, Löhningen (CH); Wolfgang Auer, Kassel (DE); Uwe Reimann, Siegen (DE); Günther Himmelstein, Oberursel (DE)

(73) Assignee: Bombardier Transportation GmbH, Berlin (DE)

( * ) Notice: Subject to any disclaimer, the term of this patent is extended or adjusted under 35 U.S.C. 154(b) by 1253 days.

(21) Appl. No.: 10/526,975

(22) PCT Filed: Sep. 5, 2003

(86) PCT No.: PCT/EP03/09886
§ 371 (c)(1), (2), (4) Date: Oct. 25, 2005

(87) PCT Pub. No.: WO2004/022406
PCT Pub. Date: Mar. 18, 2004

(65) Prior Publication Data
US 2006/0095179 A1 May 4, 2006

(30) Foreign Application Priority Data
Sep. 5, 2002 (DE) ................ 102 40 962

(51) Int. Cl.
*G06F 11/30* (2006.01)
(52) U.S. Cl. ................ 701/37; 246/167 R
(58) Field of Classification Search .......... 701/19, 701/29, 35, 37; 246/167 R, 169 R
See application file for complete search history.

(56) References Cited

U.S. PATENT DOCUMENTS

| 5,579,013 | A | * | 11/1996 | Hershey et al. ........ 342/357.06 |
| 6,044,698 | A | * | 4/2000 | Bryan .................... 73/146 |
| 6,125,311 | A | * | 9/2000 | Lo ........................ 701/29 |
| 6,681,160 | B2 | * | 1/2004 | Bidaud .................. 701/19 |
| 6,745,151 | B2 | * | 6/2004 | Marko et al. .......... 702/182 |
| 2002/0077733 | A1 | | 6/2002 | Bidaud |

FOREIGN PATENT DOCUMENTS

| DE | 10012133 | 9/2001 |
| DE | 10020521 | 10/2001 |
| DE | 10062606 | 6/2002 |

OTHER PUBLICATIONS

International Search Report (PCT/EP03/09886).

* cited by examiner

*Primary Examiner*—Dalena Tran
(74) *Attorney, Agent, or Firm*—David P. Owen; Coraline J. Haitjema; Howrey LLP

(57) ABSTRACT

The invention relates to a method for monitoring the state of vehicle chassis, particularly of rail vehicles, whereby physical quantities are measured on the chassis by means of sensors. The measured and optionally processed quantities are compared with modeled quantities by means of a processing unit. The modeled quantities are determined from specific quantities, a classification into classes of causes is performed on the basis of the comparison by means of one or the processing unit, and an evaluation is carried out based on the classification. The invention also relates to a device for carrying out the method.

14 Claims, 2 Drawing Sheets

METHOD AND DEVICE FOR MONITORING THE STATE OF VEHICLE CHASSIS

BACKGROUND OF THE INVENTION

1. Field of the Invention

The invention relates to a method and a device for monitoring the state of vehicle chassis. The invention is suitable for use in rail vehicles but is not restricted to this.

2. Description of the Related Art

Maintenance costs of rail vehicles and especially of their chassis represent a considerable fraction of the operating costs. Since it has hitherto not generally been possible to assess the actual state of chassis components of rail vehicles affected by wear or subjected to ageing process in the built-in state, testing and maintenance measures are usually carried out at fixed intervals which are associated with at least partial dismantling of the chassis. The maintenance intervals are selected to be so short that any damage or deterioration in the state of a chassis element which occurs in the meantime, does not yet result in a critical state. This has the consequence that an appreciable proportion of the work is carried out prematurely or a considerable proportion of the relevant chassis elements are replaced although no deterioration in their state has occurred.

A number of methods and devices are known for monitoring individual chassis components of rail vehicles.

A number of known solutions relate to the presence of wheel tyres or flanges. Such systems do not yield any prediction on the slowly changing state of a component but assess the instantaneous safety of the chassis system.

A number of other known solutions are restricted to measuring the vibrations or impacts in the chassis which occur during operation and only take into account the violation of pre-defined limits when making the assessment, whether this be tolerable amplitudes or reference spectra. Here also only a "good"-"bad" discrimination is therefore made.

In some known solutions a sensor is attached to components which are considered to be particularly critical, which specifically monitors this chassis element. No correlation is therefore made between the measurements at various points of the chassis. No prediction of the remaining lifetime is deduced from the measurements.

BRIEF SUMMARY OF THE INVENTION

The object of the invention is to eliminate the disadvantages of the prior art which have been described and to propose a method and a device for monitoring the state of vehicle chassis which makes it possible to continuously monitor the state of chassis components affected by wear or ageing and to make a reliable evaluation at any time. This forms the basis of a state-related inspection and maintenance regime. Great importance is attached to a minimum number of sensors required per chassis in order to keep the investment costs and also the operating or life cycle costs as low as possible. Here also, no monitoring of the chassis state is carried out with regard to possible causes for a certain chassis state.

This object is solved by a method for monitoring the state of vehicle chassis according to the features of claim 1 and a device for monitoring the state of vehicle chassis according to the features of claim 10.

According to the invention, physical variables are measured on the chassis by means of sensors. The measured and optionally processed variables are then compared with modelled variables by means of a first processing unit, wherein the modelled variables are determined from specific variables, for example, using the measured variables. From the comparison, a classification into classes of causes for possible deviations is made by means of a processing unit, for example, the first processing unit. As a result of the classification, an evaluation is then made.

It is hereby possible to continuously monitor the state of chassis components affected by wear or ageing and to make a reliable evaluation at any time. This can form the basis for a state-related inspection and maintenance regime.

The solution according to the invention makes it possible to use a minimal number of sensors per chassis so that, both, the investment costs of the monitoring system and its operating or life cycle costs can be kept as low as possible.

Compared with the prior art, on the basis of the signals from a minimum number of sensors, the solution according to the invention allows a comprehensive assessment of the state of the various components of a vehicle chassis equipped therewith, especially a rail vehicle, as well as a prediction of the future development of this state. A state-related planning of maintenance measures is thereby possible which avoids numerous superfluous and prematurely taken measures caused by a maintenance regime with fixed deadlines.

The physical variables may be any suitable variables from which the state of a vehicle component may be concluded. Speeds, accelerations and/or forces are preferably measured as physical variables.

Preferably, the processing unit comprises a model of the vehicle which continuously identifies the parameters of the vehicle and continuously compiles a simulatory prognosis of the vehicle behaviour. Additionally or alternatively, the processing unit comprises one or more damage evolution or ageing models of vehicle components with which the remaining lifetime before reaching a critical state or before a necessary maintenance measure is determined or updated.

The comparison of the measured variables and the modelled variables, eventually after processing, is preferably made by means of a correlation. For this purpose, suitable correlation methods or correlation algorithms are used, for example, by which means information can be derived from various values to be processed.

The classification is preferably made by means of a suitable electronic processing unit, for example, by means of a computer. In this case, a classification can preferably be made as to whether a cause inside the vehicle or an external cause is involved. Furthermore, a classification is preferably made as to the location of the cause involved inside the vehicle.

The modelled variables can basically be determined in any suitable fashion. Thus, for example, corresponding tables can be provided, for example, stored, by which the modelled variables are determined. However, the modelled variables are preferably calculated using corresponding calculation algorithms.

The present invention further relates to a device for monitoring the state of vehicle chassis which is especially suitable for applying the method according to the invention. According to the invention, the device has one or more sensors to measure physical variables on the chassis. It further comprises a processing unit for calculating modelled variables, a processing unit for comparing the measured and eventually processed variables with modelled variables, a processing unit for classification as the result of the comparison and means for the evaluation. In this case, separate processing units may be provided. However, all the functions may also be made available by a single processing unit.

The advantages and variants of the method according to the invention described above can be achieved to the same extent using this device so that reference is merely made here to the explanations given above.

Preferably, the processing unit comprises the model of the chassis which continuously identifies its parameters and by this means continuously compiles a simulatory prognosis of the chassis behaviour. Additionally or alternatively, the processing unit also comprises damage evolution or ageing models of chassis components with which the remaining lifetime before reaching a critical state or before a necessary maintenance measure can be determined or updated.

In further preferred variants of the device according to the invention it is provided that an interface to a superordinate vehicle control system is connected to the processing unit via which data on the actual driving state, for example, the speed of travel, can be delivered to the processing unit. Likewise, messages of the processing unit can be transmitted via the interface to a suitable memory and stored there. Likewise such messages of the processing unit can be transmitted to the driver or traction unit conductor or to any external control centre.

It is preferably provided that the means for evaluation is a signalling device inside the vehicle and, additionally or alternatively, a signalling device in a mobile or stationary control centre outside the vehicle including a data transmission device from the vehicle to the control centre.

BRIEF DESCRIPTION OF THE DRAWINGS

Further preferred embodiments of the invention are obtained from the dependent claims or the following description of a preferred exemplary embodiment which refers to the enclosed drawings. It is shown in:

DESCRIPTION OF ILLUSTRATIVE EMBODIMENTS

Figure 1:
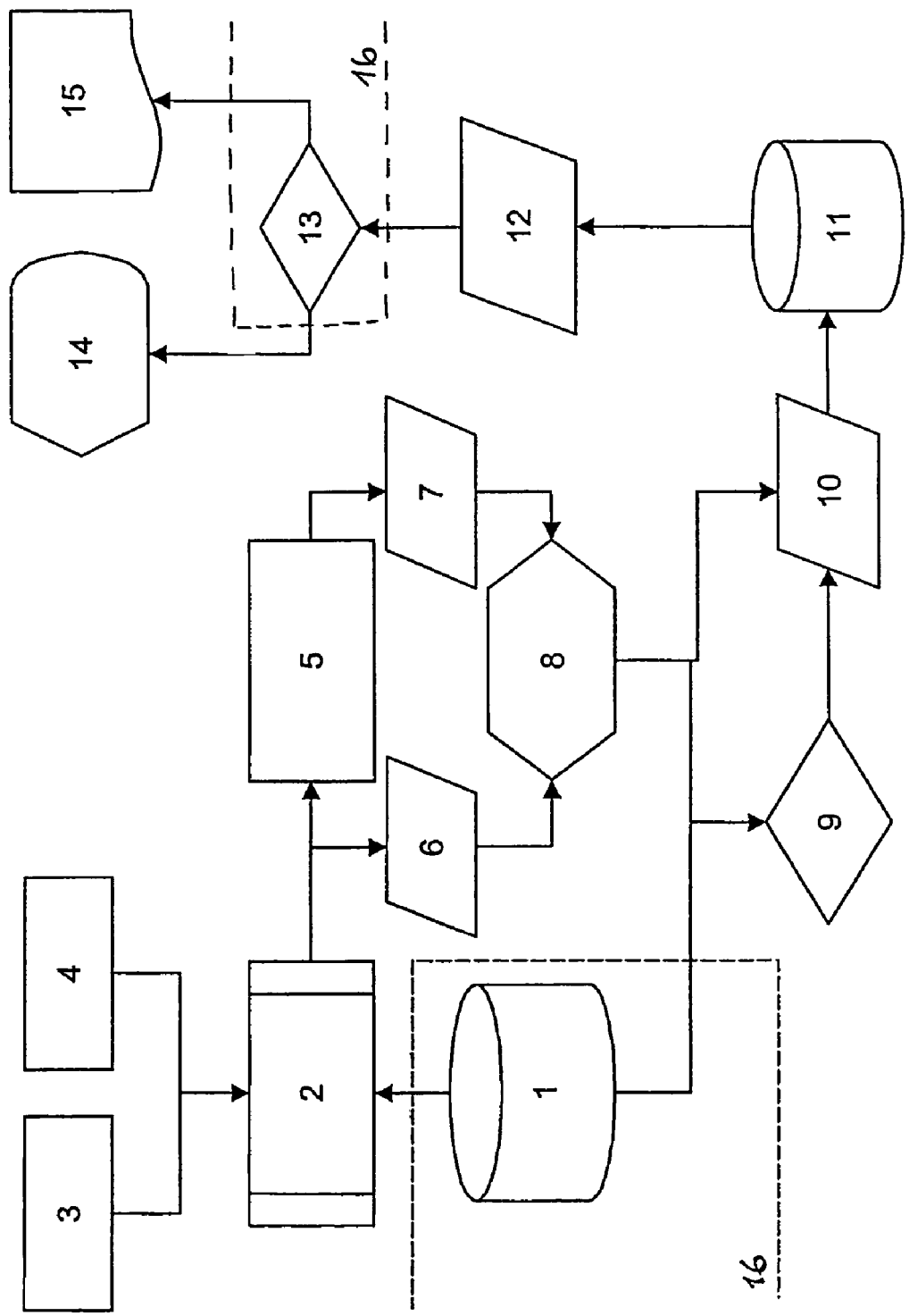
FIG. 1 a schematic diagram of a preferred embodiment of the method according to the invention for a rail vehicle.
Figure 2:
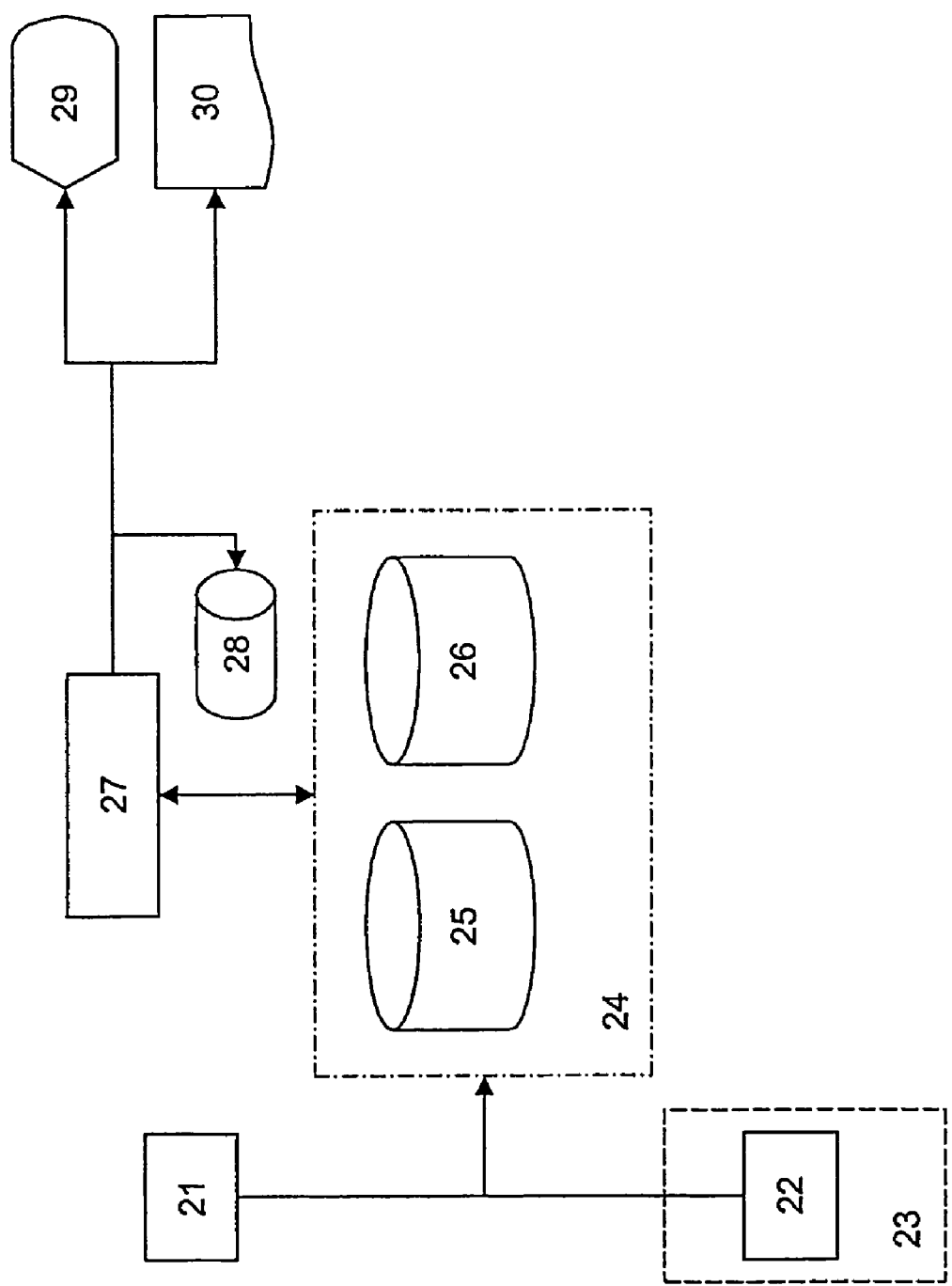
FIG. 2 a schematic diagram of a further preferred embodiment of the device according to the invention.

The method according to the invention is based on a model 1 of the chassis of the rail vehicle including any active components which may be present and on correlation methods or algorithms 2 for deriving information from various measured values 3 or values 4 delivered by the superordinate control system. Thus, on the basis of the sensor data as well as the driving state of the vehicle, its behaviour is continuously predicted in a simulatory fashion in block 5 and this prognosis is output in block 7.

Deviations of the actual behaviour determined in block 6 from this prognosis are identified early in block 8 and, using the model 1, the causative component is identified in block 9 and its state is determined or the cause is classified, respectively, in block 10. Together with a model 11 of the deviation or damage evolution, the remaining lifetime of the identified causative component is determined in block 12. It is then decided in block 13 whether operating restrictions represented in block 14 are taken and when which maintenance measures, represented in block 15, must be taken.

In an advantageous embodiment the device according to the invention comprises a number of sensors 21, 22 attached at suitable positions in the chassis of a rail vehicle, which may eventually be an integrated component of the active elements 23 in the chassis.

Further, the device comprises an electronic processing unit 24 connected to the sensors 21, 22 which comprises a unit 25 containing the model 1 of the chassis wherein the parameters of the chassis are continuously identified by means of the model 1 and a simulatory prognosis 5 of the chassis behaviour is compiled and comprises a unit 26 containing the damage evolution or ageing models 11 of chassis components and thereby determines and updates, respectively, the remaining lifetime 12 before a critical state is reached or before a necessary maintenance measure, respectively.

In an advantageous embodiment, the device according to the invention further comprises a connection to a superordinate control system 27 of the rail vehicle via which data on the actual driving state 4, e.g., the speed of travel, can be delivered to the device according to the invention or messages therefrom can be saved in a memory 28 provided for this purpose and can be transmitted to the driver or traction unit conductor 29 or an external control centre 30.

The model 1 used for the assessment and prediction of the state can preferably be a component of the integrated controller concept 16 for the active components 23 of the chassis within which the decision on the tolerability of the remaining lifetime and the measures to be taken from block 13 is taken.

The sensor 21 in the present case is a vibration sensor which is arranged on a bogie whereas the sensor 22 is a force sensor which is arranged on a drive 23 of the rail vehicle.

It is understood that in other variants of the invention, other sensors can be provided at other suitable positions of the vehicle which make it possible to obtain reliable predictions on the state of certain components of the vehicle.

Many modifications in addition to those described above may be made to the structures and techniques described herein without departing from the spirit and scope of the invention. Accordingly, although specific embodiments have been described, these are examples only and are not limiting upon the scope of the invention.

REFERENCE LIST

1 Software model of the chassis
2 Correlation methods or algorithms
3 Physical variables measured by sensors
4 Information delivered from vehicle control system
5 Simulation for predicting chassis behaviour
6 Data describing the actual chassis behaviour
7 Prediction of the chassis behaviour compiled by simulation
8 Identification of deviations between predicted and actual chassis behaviour
9 Identification of the chassis component causing the deviation
10 Determination of the actual state of the chassis component causing the deviation
11 Model of the deviation evolution or of the ageing and/or damage evolution of chassis components
12 Remaining lifetime of the chassis component being considered
13 Decision on the tolerability of the remaining lifetime which has been determined and on the measures to be taken
14 Operating restrictions
15 Required maintenance measures
21 Sensors attached in the chassis
22 Sensors integrated in active chassis components
23 Active elements or systems in the chassis
24 Electronic processing unit
25 Software model of the chassis 26 Model of the deviation evolution or of the ageing and/or damage evolution of chassis components
27 Vehicle control system
28 Memory for messages connected to the control system or integrated therein
29 Message device for the driver or traction unit conductor, e.g. display
30 Device for transmitting messages to a control center.

The invention claimed is:

1. A method for monitoring the state of a vehicle chassis, the method comprising:
   measuring physical variables on the chassis by means of sensors;
   providing a model of the vehicle chassis which continuously identifies parameters of the vehicle chassis and uses such parameters to continuously compile modeled variables in a simulatory prognosis of the vehicle chassis behavior;
   comparing the measured variables with the modeled variables by means of a processing unit, wherein the modeled variables are determined from specific variables;
   performing a classification into classes of causes on the basis of the comparison; and
   evaluating a result of the classification.

2. The method according to claim 1, wherein speeds, accelerations or forces are measured as physical variables.

3. The method according to claim 1, further comprising:
   determining or updating a remaining lifetime of vehicle components before a critical state is reached or before a maintenance measure is needed, using at least one damage evolution or ageing model of the vehicle components.

4. The method according to claim 1, wherein the comparison of the measured variables and the modelled variables is made by means of a correlation.

5. The method according to claim 1, wherein the classification is performed by means of the processing unit.

6. The method according to claim 1, wherein the classification is made as to whether a cause inside the vehicle or an external cause is involved.

7. The method according to claim 1, wherein the classification is made as to the location of the cause involved inside the vehicle.

8. The method according to claim 1, wherein the modelled variables are calculated.

9. A device for monitoring the state of a vehicle chassis, comprising:
   one or more sensors for measuring physical variables on the chassis;
   a processing unit
      for calculating modelled variables, by continuously identifying vehicle chassis parameters and continuously compiling a simulatory prognosis of the chassis behavior using a model of the chassis;
      for comparing the measured variables with the modeled variables; and
      for classifying as a result of the comparison; and
   means for evaluating the classified results.

10. The device according to claim 9, wherein the processing unit comprises:
    at least one damage evolution or ageing model of chassis components which is used to determine or update a remaining lifetime before a critical state is reached or before a maintenance measure is required.

11. The device according to claim 9, wherein an interface to a superordinate control system of the vehicle is connected to the processing unit, via which data on an actual driving state is delivered to the processing unit or messages therefrom may be saved and may be transmitted to a driver or traction unit conductor or an external control centre.

12. The device according to claim 9, wherein at least one sensor is a vibration sensor, an acceleration sensor, an impact sensor, an acoustic sensor, a sound sensor, an eddy current sensor, a magnetic field sensor, a temperature sensor, a force sensor, a strain sensor, a distance sensor, a radar Doppler sensor or an ultrasound sensor.

13. The device according to claim 12, wherein the at least one sensor is arranged on a component selected from the group consisting of:
    a wheelset, a wheel, a wheelset axle, a wheelset bearing, a bogie, a chassis frame, a primary spring suspension, a spring, a shock absorber, a wheelset guide, a secondary spring suspension, a stabiliser, a stop buffer, a traction linkage, a drive, a drive motor, a gear, a clutch, a drive suspension, a brake, a brake disk, a brake cylinder, a brake lining, a brake pad, a brake linkage and a brake caliper.

14. The device according to claim 9, wherein the means for evaluation comprise a signalling device inside the vehicle or a signalling device in a mobile or stationary control centre outside the vehicle including a data transmission device from the vehicle to the control centre.

* * * * *